(12) United States Patent
Cao et al.

(10) Patent No.: US 7,986,450 B2
(45) Date of Patent: Jul. 26, 2011

(54) ELECTRO-OPTIC DISPLAY AND MATERIALS FOR USE THEREIN

(75) Inventors: Lan Cao, Arlington, MA (US); David D. Miller, Wakefield, MA (US); Richard M. Webber, Brookline, MA (US); Shafiq N. Fazel, Allentown, PA (US)

(73) Assignees: E Ink Corporation, Cambridge, MA (US); Air Products and Chemicals, Inc., Allentown, PA (US)

( * ) Notice: Subject to any disclaimer, the term of this patent is extended or adjusted under 35 U.S.C. 154(b) by 206 days.

(21) Appl. No.: 12/351,880

(22) Filed: Jan. 12, 2009

(65) Prior Publication Data
US 2009/0237773 A1  Sep. 24, 2009

Related U.S. Application Data

(63) Continuation-in-part of application No. 11/534,336, filed on Sep. 22, 2006, now Pat. No. 7,477,444.

(51) Int. Cl.
G02F 1/03 (2006.01)
G11B 5/706 (2006.01)
C08G 18/10 (2006.01)

(52) U.S. Cl. .......... 359/245; 428/844.5; 428/844.71; 428/844.8; 345/107; 156/250; 156/257; 528/75; 528/76; 359/290; 359/296

(58) Field of Classification Search .......... 359/245, 359/290, 296; 428/844.5, 844.71, 844.8; 345/107; 156/250, 257; 528/75, 76
See application file for complete search history.

(56) References Cited

U.S. PATENT DOCUMENTS

| | | | |
|---|---|---|---|
| 3,668,106 A | 6/1972 | Ota | |
| 3,756,693 A | 9/1973 | Ota | |
| 3,767,392 A | 10/1973 | Ota | |
| 3,792,308 A | 2/1974 | Ota | |
| 3,870,517 A | 3/1975 | Ota et al. | |
| 3,892,568 A | 7/1975 | Ota | |
| 4,418,346 A | 11/1983 | Batchelder | |
| 5,745,094 A | 4/1998 | Gordon, II et al. | |
| 5,760,761 A | 6/1998 | Sheridon | |
| 5,777,782 A | 7/1998 | Sheridon | |
| 5,808,783 A | 9/1998 | Crowley | |

(Continued)

FOREIGN PATENT DOCUMENTS
EP  1 099 207 B1  3/2002
(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

Primary Examiner — Evelyn A. Lester
(74) Attorney, Agent, or Firm — David J. Cole

(57) ABSTRACT

A polyurethane formed from an isocyanate, a polyether diol and a polyester diol, the polyester diol having a molecular weight less than about 2000, or comprising two polyester diol segments connected by a steric hindrance group, each of the polyester diol segments having a molecular weight less than about 2000, the molar ratio of polyether diol to polyester diol being in the range of from about 1:9 to about 9:1. The polyurethane is useful as a lamination adhesive in electro-optic displays, and in components used to form such displays.

18 Claims, 5 Drawing Sheets

U.S. PATENT DOCUMENTS

| | | | |
|---|---|---|---|
| 5,872,552 A | 2/1999 | Gordon, II et al. | |
| 5,930,026 A | 7/1999 | Jacobson et al. | |
| 5,961,804 A | 10/1999 | Jacobson et al. | |
| 6,017,584 A | 1/2000 | Albert et al. | |
| 6,054,071 A | 4/2000 | Mikkelsen, Jr. | |
| 6,055,091 A | 4/2000 | Sheridon et al. | |
| 6,067,185 A | 5/2000 | Albert et al. | |
| 6,097,531 A | 8/2000 | Sheridon | |
| 6,118,426 A | 9/2000 | Albert et al. | |
| 6,120,588 A | 9/2000 | Jacobson | |
| 6,120,839 A | 9/2000 | Comiskey et al. | |
| 6,124,851 A | 9/2000 | Jacobson | |
| 6,128,124 A | 10/2000 | Silverman | |
| 6,130,773 A | 10/2000 | Jacobson et al. | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,172,798 B1 | 1/2001 | Albert et al. | |
| 6,177,921 B1 | 1/2001 | Comiskey et al. | |
| 6,184,856 B1 | 2/2001 | Gordon, II et al. | |
| 6,225,971 B1 | 5/2001 | Gordon, II et al. | |
| 6,232,950 B1 | 5/2001 | Albert et al. | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,271,823 B1 | 8/2001 | Gordon, II et al. | |
| 6,300,932 B1 | 10/2001 | Albert | |
| 6,301,038 B1 | 10/2001 | Fitzmaurice et al. | |
| 6,312,304 B1 | 11/2001 | Duthaler et al. | |
| 6,312,971 B1 | 11/2001 | Amundson et al. | |
| 6,323,989 B1 | 11/2001 | Jacobson et al. | |
| 6,327,072 B1 | 12/2001 | Comiskey et al. | |
| 6,376,828 B1 | 4/2002 | Comiskey | |
| 6,377,387 B1 | 4/2002 | Duthaler et al. | |
| 6,392,785 B1 | 5/2002 | Albert et al. | |
| 6,392,786 B1 | 5/2002 | Albert | |
| 6,413,790 B1 | 7/2002 | Duthaler et al. | |
| 6,422,687 B1 | 7/2002 | Jacobson | |
| 6,445,374 B2 | 9/2002 | Albert et al. | |
| 6,445,489 B1 | 9/2002 | Jacobson et al. | |
| 6,459,418 B1 | 10/2002 | Comiskey et al. | |
| 6,473,072 B1 | 10/2002 | Comiskey et al. | |
| 6,480,182 B2 | 11/2002 | Turner et al. | |
| 6,498,114 B1 | 12/2002 | Amundson et al. | |
| 6,504,524 B1 | 1/2003 | Gates et al. | |
| 6,506,438 B2 | 1/2003 | Duthaler et al. | |
| 6,512,354 B2 | 1/2003 | Jacobson et al. | |
| 6,515,649 B1 | 2/2003 | Albert et al. | |
| 6,518,949 B2 | 2/2003 | Drzaic | |
| 6,521,489 B2 | 2/2003 | Duthaler et al. | |
| 6,531,997 B1 | 3/2003 | Gates et al. | |
| 6,535,197 B1 | 3/2003 | Comiskey et al. | |
| 6,538,801 B2 | 3/2003 | Jacobson et al. | |
| 6,545,291 B1 | 4/2003 | Amundson et al. | |
| 6,580,545 B2 | 6/2003 | Morrison et al. | |
| 6,639,578 B1 | 10/2003 | Comiskey et al. | |
| 6,652,075 B2 | 11/2003 | Jacobson | |
| 6,657,772 B2 | 12/2003 | Loxley | |
| 6,664,944 B1 | 12/2003 | Albert et al. | |
| D485,294 S | 1/2004 | Albert | |
| 6,672,921 B1 | 1/2004 | Liang et al. | |
| 6,680,725 B1 | 1/2004 | Jacobson | |
| 6,683,333 B2 | 1/2004 | Kazlas et al. | |
| 6,693,620 B1 | 2/2004 | Herb et al. | |
| 6,704,133 B2 | 3/2004 | Gates et al. | |
| 6,710,540 B1 | 3/2004 | Albert et al. | |
| 6,721,083 B2 | 4/2004 | Jacobson et al. | |
| 6,724,519 B1 | 4/2004 | Comiskey et al. | |
| 6,727,881 B1 | 4/2004 | Albert et al. | |
| 6,738,050 B2 | 5/2004 | Comiskey et al. | |
| 6,750,473 B2 | 6/2004 | Amundson et al. | |
| 6,753,999 B2 | 6/2004 | Zehner et al. | |
| 6,788,449 B2 | 9/2004 | Liang et al. | |
| 6,816,147 B2 | 11/2004 | Albert | |
| 6,819,471 B2 | 11/2004 | Amundson et al. | |
| 6,822,782 B2 | 11/2004 | Pratt et al. | |
| 6,825,068 B2 | 11/2004 | Denis et al. | |
| 6,825,829 B1 | 11/2004 | Albert et al. | |
| 6,825,970 B2 | 11/2004 | Goenaga et al. | |
| 6,831,769 B2 * | 12/2004 | Holman et al. | 359/296 |
| 6,839,158 B2 | 1/2005 | Albert et al. | |
| 6,842,167 B2 | 1/2005 | Albert et al. | |
| 6,842,279 B2 | 1/2005 | Amundson | |
| 6,842,657 B1 | 1/2005 | Drzaic et al. | |
| 6,864,875 B2 | 3/2005 | Drzaic et al. | |
| 6,865,010 B2 | 3/2005 | Duthaler et al. | |
| 6,866,760 B2 | 3/2005 | Paolini, Jr. et al. | |
| 6,870,657 B1 | 3/2005 | Fitzmaurice et al. | |
| 6,870,661 B2 | 3/2005 | Pullen et al. | |
| 6,900,851 B2 | 5/2005 | Morrison et al. | |
| 6,922,276 B2 | 7/2005 | Zhang et al. | |
| 6,950,220 B2 | 9/2005 | Abramson et al. | |
| 6,958,848 B2 | 10/2005 | Cao et al. | |
| 6,967,640 B2 | 11/2005 | Albert et al. | |
| 6,980,196 B1 | 12/2005 | Turner et al. | |
| 6,982,178 B2 | 1/2006 | LeCain et al. | |
| 6,987,603 B2 | 1/2006 | Paolini, Jr. et al. | |
| 6,995,550 B2 | 2/2006 | Jacobson et al. | |
| 7,002,728 B2 | 2/2006 | Pullen et al. | |
| 7,012,600 B2 | 3/2006 | Zehner et al. | |
| 7,012,735 B2 | 3/2006 | Honeyman et al. | |
| 7,023,420 B2 | 4/2006 | Comiskey et al. | |
| 7,030,412 B1 | 4/2006 | Drzaic et al. | |
| 7,030,854 B2 | 4/2006 | Baucom et al. | |
| 7,034,783 B2 | 4/2006 | Gates et al. | |
| 7,038,655 B2 | 5/2006 | Herb et al. | |
| 7,061,663 B2 | 6/2006 | Cao et al. | |
| 7,071,913 B2 | 7/2006 | Albert et al. | |
| 7,075,502 B1 | 7/2006 | Drzaic et al. | |
| 7,075,703 B2 | 7/2006 | O'Neil et al. | |
| 7,079,305 B2 | 7/2006 | Paolini, Jr. et al. | |
| 7,106,296 B1 | 9/2006 | Jacobson | |
| 7,109,968 B2 | 9/2006 | Albert et al. | |
| 7,110,163 B2 | 9/2006 | Webber et al. | |
| 7,110,164 B2 | 9/2006 | Paolini, Jr. et al. | |
| 7,116,318 B2 | 10/2006 | Amundson et al. | |
| 7,116,466 B2 | 10/2006 | Whitesides et al. | |
| 7,119,772 B2 | 10/2006 | Amundson et al. | |
| 7,148,128 B2 | 12/2006 | Jacobson | |
| 7,167,155 B1 | 1/2007 | Albert et al. | |
| 7,170,670 B2 | 1/2007 | Webber | |
| 7,173,752 B2 * | 2/2007 | Doshi et al. | 359/296 |
| 7,176,880 B2 | 2/2007 | Amundson et al. | |
| 7,180,649 B2 | 2/2007 | Morrison et al. | |
| 7,190,008 B2 | 3/2007 | Amundson et al. | |
| 7,193,625 B2 | 3/2007 | Danner et al. | |
| 7,202,847 B2 | 4/2007 | Gates | |
| 7,202,991 B2 | 4/2007 | Zhang et al. | |
| 7,206,119 B2 | 4/2007 | Honeyman et al. | |
| 7,223,672 B2 | 5/2007 | Kazlas et al. | |
| 7,230,750 B2 | 6/2007 | Whitesides et al. | |
| 7,230,751 B2 | 6/2007 | Whitesides et al. | |
| 7,236,290 B1 | 6/2007 | Zhang et al. | |
| 7,236,291 B2 | 6/2007 | Kaga et al. | |
| 7,236,292 B2 | 6/2007 | LeCain et al. | |
| 7,242,513 B2 | 7/2007 | Albert et al. | |
| 7,247,379 B2 | 7/2007 | Pullen et al. | |
| 7,256,766 B2 | 8/2007 | Albert et al. | |
| 7,259,744 B2 | 8/2007 | Arango et al. | |
| 7,280,094 B2 | 10/2007 | Albert | |
| 7,304,634 B2 | 12/2007 | Albert et al. | |
| 7,304,787 B2 | 12/2007 | Whitesides et al. | |
| 7,312,784 B2 | 12/2007 | Baucom et al. | |
| 7,312,794 B2 | 12/2007 | Zehner et al. | |
| 7,312,916 B2 | 12/2007 | Pullen et al. | |
| 7,321,459 B2 | 1/2008 | Masuda et al. | |
| 7,327,511 B2 | 2/2008 | Whitesides et al. | |
| 7,352,353 B2 | 4/2008 | Albert et al. | |
| 7,365,394 B2 | 4/2008 | Denis et al. | |
| 7,365,733 B2 | 4/2008 | Duthaler et al. | |
| 7,382,363 B2 | 6/2008 | Albert et al. | |
| 7,388,572 B2 | 6/2008 | Duthaler et al. | |
| 7,391,555 B2 | 6/2008 | Albert et al. | |
| 7,477,444 B2 * | 1/2009 | Cao et al. | 359/296 |

| | | |
|---|---|---|
| 2002/0060321 A1 | 5/2002 | Kazlas et al. |
| 2002/0090980 A1 | 7/2002 | Wilcox et al. |
| 2002/0113770 A1 | 8/2002 | Jacobson et al. |
| 2003/0011560 A1 | 1/2003 | Albert et al. |
| 2003/0102858 A1 | 6/2003 | Jacobson et al. |
| 2003/0151702 A1 | 8/2003 | Morrison et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0226820 A1 | 11/2004 | Webber et al. |
| 2004/0257635 A1 | 12/2004 | Paolini, Jr. et al. |
| 2004/0263947 A1 | 12/2004 | Drzaic et al. |
| 2005/0001810 A1 | 1/2005 | Yakushiji et al. |
| 2005/0001812 A1 | 1/2005 | Amundson et al. |
| 2005/0007336 A1 | 1/2005 | Albert et al. |
| 2005/0012980 A1 | 1/2005 | Wilcox et al. |
| 2005/0018273 A1 | 1/2005 | Honeyman et al. |
| 2005/0024353 A1 | 2/2005 | Amundson et al. |
| 2005/0062714 A1 | 3/2005 | Zehner et al. |
| 2005/0099672 A1 | 5/2005 | Jacobson et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0122564 A1 | 6/2005 | Zehner et al. |
| 2005/0151709 A1 | 7/2005 | Jacobson et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0212747 A1 | 9/2005 | Amundson |
| 2005/0253777 A1 | 11/2005 | Zehner et al. |
| 2005/0259068 A1 | 11/2005 | Nihei et al. |
| 2005/0270261 A1 | 12/2005 | Danner et al. |
| 2005/0280626 A1 | 12/2005 | Amundson et al. |
| 2006/0007527 A1 | 1/2006 | Paolini, Jr. et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0223282 A1 | 10/2006 | Amundson et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0262060 A1 | 11/2006 | Amundson |
| 2006/0263927 A1* | 11/2006 | Sakurai et al. ............ 438/73 |
| 2006/0279527 A1 | 12/2006 | Zehner et al. |
| 2006/0291034 A1 | 12/2006 | Patry et al. |
| 2007/0035532 A1 | 2/2007 | Amundson et al. |
| 2007/0035808 A1* | 2/2007 | Amundson et al. ........... 359/296 |

FOREIGN PATENT DOCUMENTS

| | | |
|---|---|---|
| EP | 1 145 072 B1 | 5/2003 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |
| WO | WO 2005/034074 | 4/2005 |
| WO | WO 2005/052905 | 6/2005 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoreticinformation Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1 " SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

US 7,986,450 B2

ELECTRO-OPTIC DISPLAY AND MATERIALS FOR USE THEREIN

REFERENCE TO RELATED APPLICATIONS

This application is a continuation-in-part of copending application Ser. No. 11/534,336, filed Sep. 22, 2006 (Publication No. 2008/0074730).

This application is related to application Ser. No. 10/708,121, filed Feb. 10, 2004 (now U.S. Pat. No. 7,110,163), which is a continuation-in-part of application Ser. No. 10/064,389, filed Jul. 9, 2002 (now U.S. Pat. No. 6,831,769), which claims benefit of Application Ser. No. 60/304,117, filed Jul. 9, 2001. The aforementioned application Ser. No. 10/708,121 claims benefit of Application Ser. No. 60/319,934, filed Feb. 11, 2003 and Application Ser. No. 60/319,973, filed Feb. 26, 2003.

This application is also related to copending application Ser. No. 10/605,024, filed Sep. 2, 2003 (Publication No. 2004/0155857), which claims benefit of Application Ser. No. 60/319,516, filed Sep. 3, 2002.

This application is also related to application Ser. No. 10/907,065, filed Mar. 18, 2005 (now U.S. Pat. No. 7,236,292), which is a divisional of application Ser. No. 10/249,957, filed May 22, 2003 (now U.S. Pat. No. 6,982,178), which claims benefit of Application Ser. No. 60/319,300, filed Jun. 10, 2002, and Application Ser. No. 60/320,186, filed May 12, 2003.

This application is also related to the following applications and patents: (a) U.S. Pat. No. 6,727,881; (b) U.S. Pat. No. 6,727,881; (c) U.S. Pat. No. 6,124,851; (d) U.S. Pat. No. 7,106,296 issued on application Ser. No. 08/983,404, filed Mar. 26, 1999, the United States national phase of International Application No. PCT/US96/12000 (Publication No. WO 97/04398); (f) U.S. Pat. No. 6,120,588; (g) Provisional Application Ser. Nos. 60/057,118; 60/057,122; 60/057,133; 60/057,163; 60/057,716; 60/057,798; 60/057,799; 60/059,358; 60/059,543; 60/065,529; 60/065,605; 60/065,630; 60/066,115; 60/066,147; 60/066,245; 60/066,246; 60/066,334; 60/066,418; 60/070,935; 60/070,939; 60/070,940; 60/071,371; 60/072,390; 60/074,454; 60/076,955; 60/076,956; 60/076,957; 60/076,959; 60/076,978; 60/078,363; 60/081,362; 60/081,374; 60/083,252; 60/085,096; 60/090,222; 60/090,223; 60/090,232; 60/092,046; 60/092,050; 60/092,742; and 60/093,689; (h) U.S. Pat. No. 6,657,772; (i) Application Ser. No. 60/304,015; (j) U.S. Pat. No. 6,982,178; and (k) U.S. Pat. No. 6,312,304.

The entire contents of all the aforementioned patents and applications, and of all United States Patents, published applications and copending applications mentioned below are herein incorporated by reference.

BACKGROUND OF INVENTION

This invention relates to electro-optic displays and to materials, especially binders and lamination adhesives, for use therein. This invention relates in part to binders and adhesives with electrical and other properties which render them especially suitable for use in electro-optic displays. The invention also provides polyurethanes which may also be useful in applications other than electro-optic displays. This invention also relates to certain articles of manufacture useful in the production of electro-optic displays.

Electro-optic displays comprise a layer of electro-optic material, a term which is used herein in its conventional meaning in the art to refer to a material having first and second display states differing in at least one optical property, the material being changed from its first to its second display state by application of an electric field to the material. The optical property is typically color perceptible to the human eye, but may be another optical property, such as optical transmission, reflectance, luminescence or, in the case of displays intended for machine reading, pseudo-color in the sense of a change in reflectance of electromagnetic wavelengths outside the visible range.

The electro-optic displays of the present invention typically contain an electro-optic material which is a solid in the sense that the electro-optic material has solid external surfaces, although the material may, and often does, have internal liquid- or gas-filled spaces, and to methods for assembling displays using such an electro-optic material. Such displays using solid electro-optic materials may hereinafter for convenience be referred to as "solid electro-optic displays". Thus, the term "solid electro-optic displays" includes rotating bichromal member displays (see below), encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071; 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18 (3), 24 (March 2002). See also Bach, U., et al., Adv. Mater., 2002, 14 (11), 845. Nanochromic films of this type are also described, for example, in U.S. Pat. Nos. 6,301,038; 6,870.657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication Nos. 2005/0259068, 2006/0087479, 2006/0087489, 2006/0087718, 2006/0209008, 2006/0214906, 2006/0231401, 2006/0238488, 2006/0263927 and U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,693,620; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,220; 6,958,848; 6,967,640; 6,980,196; 6,982,178; 6,987,603; 6,995,550; 7,002,728; 7,012,600; 7,012,735; 7,023,420; 7,030,412; 7,030,854; 7,034,783; 7,038,655; 7,061,623; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,290; 7,236,292; 7,242,513; 7,247,379; 7,256,766; 7,259,744; 7,280,094; 7,304,634; 7,304,787; 7,312,784; 7,312,794; 7,312,916; 7,237,511; 7,339,715; 7,349,148; 7,352,353; 7,365,394; and 7,365,733; and U.S. Patent Applications Publication Nos. 2002/0060321; 2002/0090980; 2003/0102858; 2003/0151702; 2003/0222315; 2004/0105036; 2004/0112750; 2004/0119681; 2004/0155857; 2004/0180476; 2004/0190114; 2004/0257635; 2004/0263947; 2005/0000813; 2005/0007336; 2005/0012980; 2005/0018273; 2005/0024353; 2005/0062714; 2005/0099672; 2005/0122284; 2005/0122306; 2005/0122563; 2005/0134554; 2005/0151709; 2005/0152018; 2005/0156340; 2005/0179642; 2005/0190137; 2005/0212747; 2005/0253777; 2005/0280626; 2006/0007527; 2006/0038772; 2006/0139308; 2006/0139310; 2006/0139311; 2006/0176267; 2006/0181492; 2006/0181504; 2006/0194619; 2006/0197737; 2006/0197738; 2006/0202949; 2006/0223282; 2006/0232531; 2006/0245038; 2006/0262060; 2006/0279527; 2006/0291034; 2007/0035532; 2007/0035808; 2007/0052757; 2007/0057908; 2007/0069247; 2007/0085818; 2007/0091417; 2007/0091418; 2007/0109219; 2007/0128352; 2007/0146310; 2007/0152956; 2007/0153361; 2007/0200795; 2007/0200874; 2007/0201124; 2007/0207560; 2007/0211002; 2007/0211331; 2007/0223079; 2007/0247697; 2007/0285385; 2007/0286975; 2007/0286975; 2008/0013155; 2008/0013156; 2008/0023332; 2008/0024429; 2008/0024482; 2008/0030832; 2008/0043318; 2008/0048969; 2008/0048970; 2008/0054879; 2008/0057252; and 2008/0074730; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called "polymer-dispersed electrophoretic display" in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media. Furthermore, the continuous phase of such a polymer-dispersed electrophoretic medium may be regarded as a binder since it surrounds and encapsulates the individual droplets in the same manner that a binder surrounds the individual capsules in a conventional encapsulated electrophoretic display.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc. Hereinafter, the term "microcavity electrophoretic display" may be used to cover both encapsulated and microcell electrophoretic displays.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

Other types of electro-optic materials, for example, polymer-dispersed liquid crystal, may also be used in some of the displays of the present invention.

In considering the choice of materials for use in an electro-optic display, attention must be paid to the process by which the display is to be assembled. Most prior art methods for final production of electrophoretic displays are essentially batch methods in which the electro-optic medium, a lamination adhesive and the backplane are only brought together immediately prior to final assembly, and it is desirable to provide methods better adapted for mass production. The aforementioned U.S. Pat. No. 6,982,178 describes a method of assembling a solid electro-optic display (including a particle-based electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 µm), preferably about 2 to about 10 mil (51 to 254 µm). The electrically-conductive layer is conveniently a thin metal oxide layer of, for example, aluminum or indium tin oxide (ITO), or may be a conductive polymer. Polyethylene terephthalate (PET) films coated with aluminum or ITO are available commercially, for example as "aluminized Mylar" ("Mylar" is a Registered Trade Mark) from E. I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release film" which is essentially a simplified version of the front plane laminate previously described. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display.

The aforementioned U.S. Pat. No. 7,110,164 describes a process for assembling an electro-optic display in which a layer of an electro-optic medium is coated on a first release sheet, a layer of lamination adhesive is coated on a second release sheet, and the two resulting structures are laminated together to form a structure comprising, in order, the first release sheet, the electro-optic layer, the adhesive layer and the second release sheet.

In view of the advantages of the assembly method using a front plane laminate described in the aforementioned U.S. Pat. No. 6,982,178, it is desirable that materials intended for use in an electro-optic display be capable of being incorporated into such a front plane laminate. It is also desirable that such materials be capable of being incorporated into a double release film as previously described, and in the aforementioned structure described in U.S. Pat. No. 7,110,164.

As already indicated, when an electro-optic display is produced using a front plane laminate or double release film, a layer of lamination adhesive is normally present between the electrodes in the final display. (More than one layer of adhesive may be present between the electrodes; see for example copending Application Ser. No. 60/596,743, filed Oct. 18, 2005, which describes a form of double release film referred to as an "inverted front plane laminate".) As discussed in the aforementioned U.S. Pat. No. 6,831,769, the electrical properties of the lamination adhesive can have a substantial effect on the electro-optic properties of the display. However, the lamination adhesive is not necessarily the only polymeric component present between the electrodes in an electro-optic display. As described in, for example, the aforementioned U.S. Pat. No. 6,839,158, in an encapsulated electrophoretic display the electro-optic layer normally comprises, in addition to the capsules themselves, a polymeric binder which, upon drying or curing, serves to form the capsules into a mechanically coherent layer especially when, as this patent teaches is desirable, the capsules are present in the form of a monolayer of capsules. The binder is also present between the electrodes in the final display and hence also affects the electro-optic properties of the display. Indeed, to the extent that the binder lies closer to the capsules of an encapsulated electrophoretic display than does the lamination adhesive (which is typically separated from the internal phase by some thickness of binder), the binder may have a greater effect on the electro-optic properties of a display than the lamination adhesive. Similarly the continuous matrix of a rotating bichromal member medium, the continuous phase of a polymer-dispersed electrophoretic display and the wall material used in a microcell display (all of which essentially correspond to the binder of an encapsulated electrophoretic display, and all of which will hereinafter be considered binders) can have major effects on the electro-optic properties of the display. One aspect of the present invention relates to binders with improved electrical and mechanical properties for use in electro-optic displays, and to displays, front plane laminates, inverted front plane laminates and double release films incorporating such binders.

As set out in more detail below, a first aspect of this invention provides a binder for use in electro-optic displays, this binder comprising a polyurethane formed from an isocyanate and a polyester diol having a molecular weight less than about 2000, or a polyester diol containing two polyester diol segments connecting by a steric hindrance group, each of the polyester diol segments having a molecular weight less than about 2000. There are manufacturing and storage stability advantages in making the binder and the lamination adhesive of an electro-optic display chemically identical or similar. However, the aforementioned binder cannot be used as a lamination adhesive because it has insufficient adhesive properties and is too rigid, resulting in poor lamination quality, with defects such as lamination voids.

It has now been found that chemical modification of the aforementioned polyurethane binder can produce a material having improved adhesive properties and lower rigidity, thus rendering it suitable for use as a lamination adhesive in electro-optic displays. Furthermore, it has been found that the resultant adhesive can be coated directly on to a dried electrophoretic layer, thus simplifying the manufacturing process for an electro-optic display.

SUMMARY OF INVENTION

Accordingly, this invention provides a first polyurethane, this first polyurethane being formed from an isocyanate and a polyester diol having a molecular weight less than about 2000, or a polyester diol containing two polyester diol segments connecting by a steric hindrance group, each of the polyester diol segments having a molecular weight less than about 2000.

The term "steric hindrance group" is used herein to denote any group capable of connecting two polyester diol segments together and having sufficient bulk to provide steric hindrance to the crystallization of the segments. The steric hindrance group may comprise, for example, a quaternary carbon atom; a specific useful group being a $—C(CH_3)_2—$ grouping.

This first polyurethane of the present invention may be formed from a polycaprolactone diol having a molecular weight less than about 1500. When the polycaprolactone diol comprises two polycaprolactone segments connected by a steric hindrance group, each of the segments may have a molecular weight not greater than about 1500. The polyurethane may be in the form of an aqueous latex.

This invention also provides a second polyurethane of the present invention, this second polyurethane being formed from an isocyanate and a polyester diol, the polyurethane not crystallizing between about −10° C. and about 70° C. when coated as a thin film. The term "thin film" is used herein to denote a film having a thickness of the order of about 20 μm.

The second polyurethane may be in the form of an aqueous latex.

This invention extends to an electro-optic display comprising a layer of a solid electro-optic material, and at least one electrode arranged to apply an electric field to the layer of electro-optic material, the layer of electro-optic material comprising a binder, wherein the binder comprises a first or second polyurethane of the present invention.

This invention also provides an electronic book reader, portable computer, tablet computer, cellular telephone, smart card, sign, watch, shelf label or flash drive comprising a display of the present invention.

This invention also extends to an article of manufacture (a front plane laminate) comprising in order: a light-transmissive electrically-conductive layer; a layer of a solid electro-optic medium comprising a binder and in electrical contact with the electrically-conductive layer; an adhesive layer; and a release sheet, wherein the binder comprises a first or second polyurethane of the present invention.

This invention also extends to an article of manufacture (a double release film) comprising a layer of a solid electro-optic medium comprising a binder and having first and second surfaces on opposed sides thereof, a first adhesive layer on the first surface of the layer of electro-optic medium; a release sheet disposed on the opposed side of the first adhesive layer from the layer of electro-optic medium; and a second adhesive layer on the second surface of the layer of electro-optic medium, wherein the binder comprises a first or second polyurethane of the present invention.

This invention also extends to an article of manufacture (an inverted front plane laminate) comprising, in order: at least one of a light-transmissive protective layer and a light-transmissive electrically-conductive layer; an adhesive layer; a layer of a solid electro-optic medium comprising a binder; and a release sheet, wherein the binder comprises a first or second polyurethane of the present invention.

This invention also extends to an article of manufacture (a double release film) comprising:
a layer of a solid electro-optic medium comprising a binder and having first and second surfaces on opposed sides thereof,
a first release sheet covering the first surface of the layer of solid electro-optic medium; and
a second release sheet covering the second surface of the layer of solid electro-optic medium,
wherein the binder comprises a polyurethane of the present invention.

This invention also extends to an article of manufacture comprising:
a first release sheet;
a layer of a solid electro-optic medium comprising a binder;
an adhesive layer; and
a second release sheet,
wherein the binder comprises a polyurethane of the present invention.

As already indicated, the first and second polyurethanes of the present invention are intended for use as binders in electro-optic displays. However, it has now been found that a modified form of the first polyurethane is useful as a lamination adhesive in such displays.

Accordingly, this invention provides a third polyurethane formed from an isocyanate, a polyether diol and a polyester diol, the polyester diol having a molecular weight less than about 2000, or comprising two polyester diol segments connected by a steric hindrance group, each of the polyester diol segments having a molecular weight less than about 2000, the molar ratio of polyether diol to polyester diol being in the range of from about 1:9 to about 9:1.

In such a third (or "lamination adhesive") polyurethane, the molar ratio of polyether diol to polyester diol may be in the range of from about 1:4 to about 4:1. The polyester diol may be a polycaprolactone diol having a molecular weight less than about 1500, or a polycaprolactone diol comprising two polycaprolactone segments connected by a bending group, each of the polycaprolactone segments having a molecular weight not greater than about 1500. Poly(adipate) diols may also be useful in forming the polyurethanes of the present invention. The isocyanate may be 4,4'-methylenebis (cyclohexyl isocyanate), usually known in the polyurethane industry as "$H_{12}MDI$". The polyether diol may be a poly (propylene oxide) diol, preferably one having a molecular weight in the range of from about 1000 to about 3000. A preferred molar ratio of isocyanate to hydroxyl groups in the polyurethane is less than about 1.3. The polyurethane may have a crossover temperature (the temperature at which its storage modulus equals its loss modulus) in the range of from about 10 to about 90° C., and preferably about 40 to about 80° C., at 1 Hz. The polyurethane may have the form of an aqueous latex.

This invention also provides a sub-assembly for use in constructing an electro-optic display, the sub-assembly comprising a layer of a solid electro-optic material and a layer of lamination adhesive adhered to the layer of electro-optic material, the layer of lamination adhesive comprising a third polyurethane of the present invention. Such a sub-assembly may further comprise a light-transmissive electrically-conductive layer on the opposed side of the layer of electro-optic material from the layer of lamination adhesive; and a release sheet on the opposed side of the layer of lamination adhesive from the layer of electro-optic material (so that the sub-assembly has the form of a front plane laminate). Alternatively, such a sub-assembly may further comprise a second adhesive layer on the opposed side of the layer of electro-optic material from the layer of lamination adhesive; and a release sheet disposed on the opposed side of the second adhesive layer from the layer of electro-optic material (so that the sub-assembly has the form of a double release film). A third form of the sub-assembly further comprises, on the opposed side of the layer of lamination adhesive from the layer of electro-optic material, at least one of a light-transmissive protective layer and a light-transmissive electrically-conductive layer; and a release sheet on the opposed side of the layer of electro-optic material from the layer of lamination adhesive (so that the sub-assembly has the form of an inverted front plane laminate). Finally, such a sub-assembly may further comprise first and second release sheets covering the exposed surfaces of the layer of electro-optic material and the layer of lamination adhesive.

This invention also extends to an electro-optic display comprising such a sub-assembly and at least one electrode arranged to apply an electric field to the layer of electro-optic material, and to an electronic book reader, portable computer, tablet computer, cellular telephone, smart card, sign, watch, shelf label or flash drive comprising such a display.

DETAILED DESCRIPTION

Figure 1:
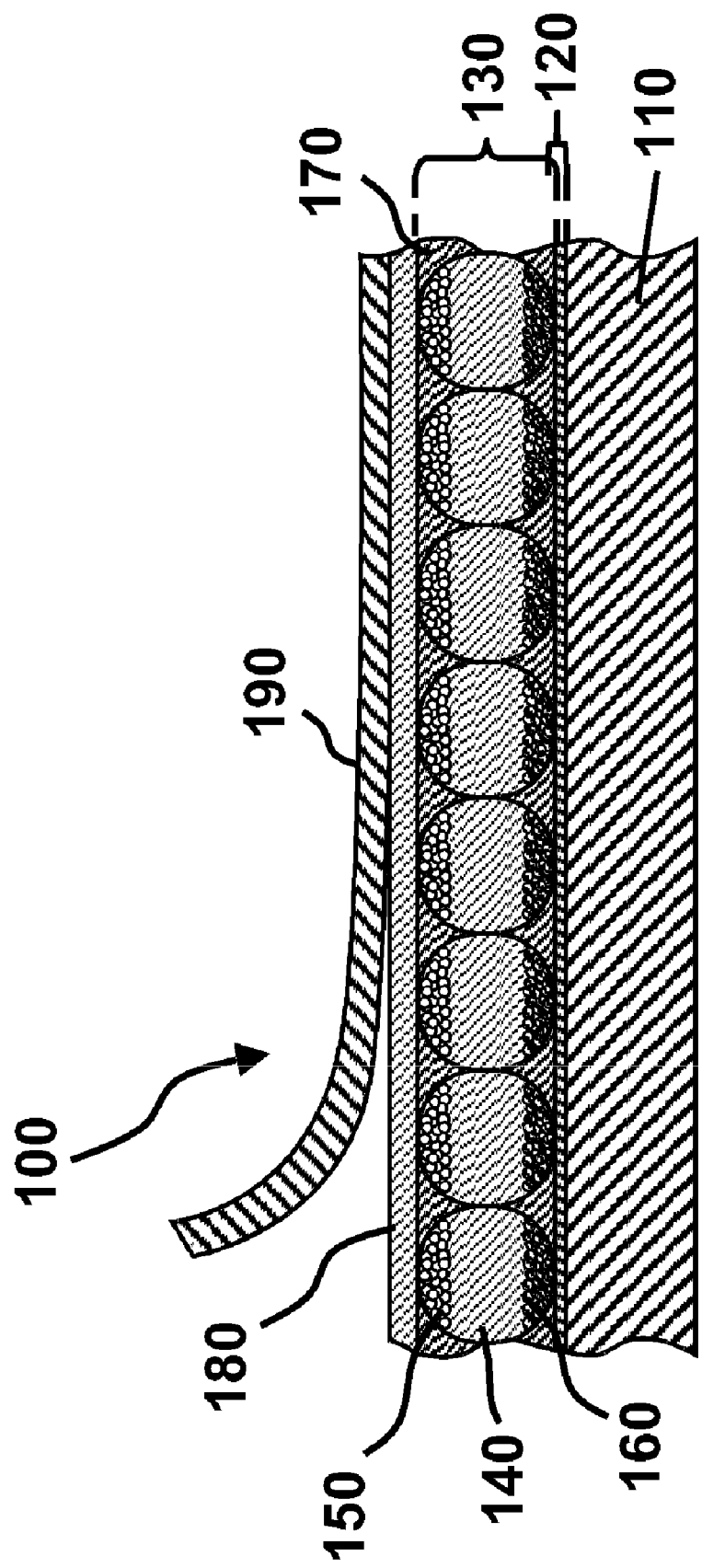
FIG. 1 is a schematic cross-section through a front plane laminate of the present invention.

One manner in which the polyurethanes of the present invention can be used as binders and lamination adhesives in the production of an electro-optic display will now be described, though by way of illustration only, with reference to FIGS. 1 and 2 of the accompanying drawings. FIG. 1 is a schematic section through one subassembly (a front plane laminate, or FPL) used in a such a process; this subassembly comprises a substrate, a conductive layer, an electro-optic layer and an adhesive layer, the subassembly being illustrated at an intermediate stage of the process before this subassembly is laminated to a second subassembly.

The front plane laminate (generally designated 100) shown in FIG. 1 comprises a light-transmissive substrate 110, a light-transmissive electrode layer 120, an electro-optic layer 130, a lamination adhesive layer 180 and a release sheet 190; the release sheet is illustrated in the process of being removed from the lamination adhesive layer 180 preparatory to lamination of the FPL 100 to a backplane.

The substrate 110 is typically a transparent plastic film, such as a 5 mil (127 µm) poly(ethylene terephthalate) (PET) sheet, although thinner plastic films, for example 3 mil (76 µm) or 0.5-1 mil (13-25 µm) can also be used. Thicker films, for example 7 mil (177 µm) can also be used when better mechanical protection of an electrode is desired. The lower surface (in FIG. 1) of substrate 110, which forms the viewing surface of the final display, may have one or more additional layers (not shown), for example a protective layer to absorb ultra-violet radiation, barrier layers to prevent ingress of oxygen or moisture into the final display, and anti-reflection coatings to improve the optical properties of the display. Coated on to the upper surface of substrate 110 is the thin light-transmissive electrically conductive layer 120, preferably of ITO, which acts as the common front electrode in the final display. PET films coated with ITO are available commercially.

The electro-optic layer 130 may be deposited on the conductive layer 120, typically by slot coating, the two layers being in electrical contact. The electro-optic layer 130 shown in FIG. 1 is an encapsulated electrophoretic medium and comprises microcapsules 140, each of which comprises negatively charged white particles 150 and positively charged black particles 160 in a hydrocarbon-based fluid. The microcapsules 140 are held retained within a polymeric binder 170. Upon application of an electrical field across electro-optic layer 130, white particles 150 move to the positive electrode and black particles 160 move to the negative electrode, so that electro-optic layer 130 appears, to an observer viewing the display through substrate 110, white or black depending on whether conductive layer 120 is positive or negative relative to the adjacent pixel electrode in the backplane.

The FPL 100 may prepared by coating the lamination adhesive 180, in liquid form, conveniently by slot coating, on to release sheet 190, drying (or otherwise curing) the adhesive to form a solid layer and then laminating the adhesive and release sheet to the electro-optic layer 130, which has previously been coated on to the substrate 110 bearing the conductive layer 120; this lamination may conveniently be effected using hot roll lamination. Alternatively, and in accordance with the present invention, especially if a third polyurethane of the present invention is used as the lamination adhesive, the lamination adhesive may be applied over the electro-optic layer 130 and there dried or otherwise cured before being covered with the release sheet 190. The release sheet 190 is conveniently a 5 mil (127 µm) film; depending upon the nature of the electro-optic medium used, it may be desirable to coat this film with a release agent, for example a silicone. As illustrated in FIG. 1, the release sheet 190 is peeled or otherwise removed from the lamination adhesive 180 before the FPL 100 is laminated to a backplane (not shown) to form the final display. Obviously, if the lamination adhesive 180 is coated directly on to electro-optic layer 130 and dried, and the resultant front plane laminate is to laminated immediately to a backplane, the release sheet 190 may be omitted.

For further details regarding front plane laminates and processes for the preparation and use thereof, the reader is respectfully directed to the aforementioned U.S. Pat. No. 6,982,178.

Figure 2:
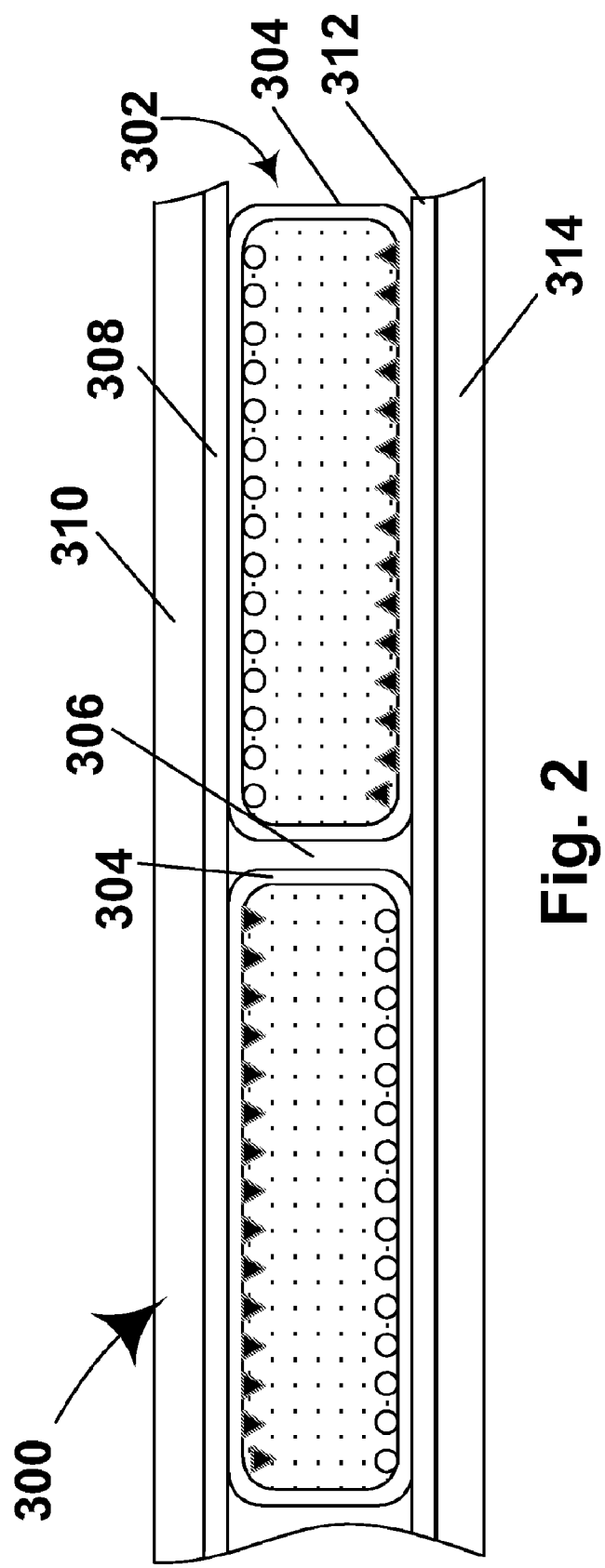
FIG. 2 is a schematic cross-section through a double release film of the present invention.

A double release sheet (generally designated 300) of the present invention is shown in FIG. 2 of the accompanying drawings. The double release sheet 300 comprises a central layer 302 of electro-optic material, specifically in FIG. 2 a layer comprising capsules 304 in a polymeric binder 306. The capsules 304 may be similar to those described above with reference to FIG. 1. The sheet 300 further comprises a first adhesive layer 308, a first release sheet 310 covering the first adhesive layer 308, a second adhesive layer 312 disposed on the opposed side of the electro-optic layer 302 from the first adhesive layer 308, and a second release sheet 314 covering the second adhesive layer 312.

The sheet 300 may be formed by first coating the release sheet 310 with a layer of adhesive, which is then dried or cured to form the first adhesive layer 308. Next, a mixture of the capsules 304 and binder 306 is printed or otherwise deposited on the first adhesive layer 308, and then the mixture is dried or cured to form a coherent layer 302. Finally, a layer of adhesive is deposited over the layer 302, dried or cured to form the second adhesive layer 312, and covered by the second release sheet 314.

It will be apparent to those skilled in coating technology that this sequence of operations used to form the sheet 300 is well adapted for continuous production and that, by careful choice of materials and process conditions, it may be possible to carry out the entire sequence of operations in a single pass through conventional roll-to-roll coating apparatus.

To assemble a display using a double release film such as the film 300, one release sheet (typically that on to which the electro-optic material was coated) is peeled away, and the remaining layers of the double release film are attached to a front substrate using, for example a thermal, radiation, or chemically based lamination process. Typically, the front substrate will include a conductive layer which will form the front electrode of the final display. The front substrate may include additional layers, such as an ultra-violet filter or a protective layer intended to protect the conductive layer from mechanical damage. Thereafter, the other release sheet is peeled away, thereby exposing the second adhesive layer, which is used to attach the electro-optic material coating assembly to a backplane. Again, a thermal, radiation, or chemically based lamination process may be used. It will be appreciated that the order of the two laminations described is essentially arbitrary and could be reversed, although it practice it is almost always more convenient to laminate the double release film to the front substrate first, and thereafter to laminate the resulting front subassembly to the backplane.

For further details regarding double release films and processes for the preparation and use thereof, the reader is respectfully directed to the aforementioned 2004/0155857.

The displays of the present invention may be used in any application in which prior art electro-optic displays have been used. Thus, for example, the present displays may be used in electronic book readers, portable computers, tablet computers, cellular telephones, smart cards, signs, watches, shelf labels and flash drives.

As already mentioned, the present invention relates to "custom" polyurethanes having properties which render them especially useful as binders and lamination adhesives in encapsulated electrophoretic and other types of electro-optic displays. The general reasons why polyurethanes are preferred as binders in electro-optic displays have already been summarized above; of the commercially available polyurethanes, NeoRez R 9314 and R 9621 are especially useful, a preferred blend comprising 75 weight percent of the former and 25 weight percent of the latter.

However, although this 75/25 blend provides good overall display performance, there are some drawbacks associated with its use. Firstly, due to the presence of a higher weight fraction of polyester segments in R 9314, this material undergoes a melting/crystallization transition around 40° C. The polymer crystallization results in changes in electrical properties of the material, which affect the display performance over time. Secondly, the use of a polymer blend is generally undesirable because the polymers in the blend could potentially undergo a macrophase separation, resulting in a heterogeneous material. Thirdly, use in electro-optic displays is a very minor use of commercial polyurethanes, so that the manufacturers of such materials may change them to improve their performance in larger scale uses in a manner which compromises their effectiveness as binders in electro-optic displays. Thus, there is a need for a single component "custom" polyurethane of known composition having properties optimized for use as a binder in electro-optic displays.

In the first and second (or "binder") polyurethanes of the present invention, the length of the polyester segment is controlled. It is known that the crystalline transition in polyurethanes such as R 9314 is due to the long polyester segments present between the urethane linkages on the polymer backbone. By reducing the length of the polyester segments (below a partial molecular weight of about 2000) between the urethane groups, the polyester segments are rendered incapable of chain folding crystallization, thus eliminating the crystallization of the polymer as a whole. To synthesize such a polymer, one uses a polyester diol with a relatively short chain length. The diol may be polycaprolactone diol having a molecular weight not greater than about 1500.

Two different types of polyester diols may be used in the binder polyurethanes. The first type is typified by the following Formula I:

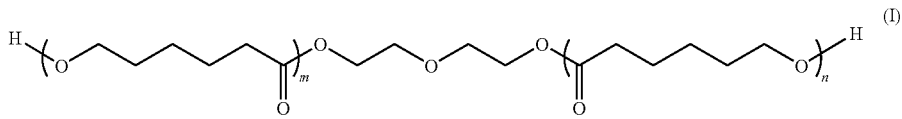

where m+n<13.

This first type of polyester diol contains two polyester segments (polycaprolactone segments in Formula I) linked by a group which does not provide any hindrance to crystallization of the polyester segments. The molecular weight of this type of polyester diol should not exceed about 2000.

The second type of polyester diol is typified by the following Formula II:

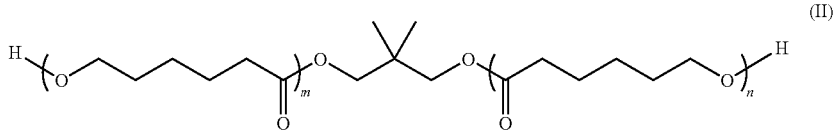

where m<13 and n<13.

This second type of polyester diol contains two polyester segments (polycaprolactone segments in Formula II) linked by a steric hindrance group which is sufficiently bulky and thus provides sufficient steric hindrance to hinder the crystallization of the polyester segments. In this type of polyester diol, the two polyester segments are in effect isolated from each other by the steric hindrance group and each segment can have a molecular weight up to about 2000.

As already noted, this invention also provides a third polyurethane designed for use as a lamination adhesive in electro-optic displays. Hitherto, as discussed above, when it is desired to provide a layer of lamination adhesive adjacent to a layer of electro-optic material, it has typically been necessary to use an "indirect process" in which the lamination adhesive is coated on to a release sheet, dried or cured to form a coherent layer, and then the lamination adhesive/release sheet sub-assembly is laminated to the layer of electro-optic material. Although it might at first glance appear simpler to use a "direct process" in which the lamination adhesive is coated directly on to the layer of electro-optic material, it has been found empirically that many lamination adhesives which give good results with an indirect process suffer from serious problems in a direct process. For example, the polyurethanes described in U.S. Published Patent Application No. 2005/0107564 give good results as lamination adhesives applied by an indirect process in encapsulated electrophoretic displays, as described in the aforementioned U.S. Pat. No. 7,012,735. However, it has been found empirically that when the same lamination adhesives are applied in a direct process, the final electrophoretic displays shows very poor switching. Furthermore, as already mentioned the first and second polyurethanes of the present invention, although giving good results as binders in electrophoretic displays, are not suitable as lamination adhesives in such displays because they lack sufficient adhesive properties and are too rigid, having crossover temperatures greater than about 180° C. at 1 Hz.

Empirically, it was found that, for polyurethanes of constant molecular weight, substantial reduction of this high crossover temperature could be effected by reducing the isocyanate to hydroxyl molar ratio, which in the preferred binder polyurethanes of the present invention is about 1.4 (cf. Examples 1 and 2 below) to about 1.3, and preferably to about 1.2; a modified version of the polyurethane of Example 1 having a molar ratio of about 1.2, proved to have a crossover temperature of about 60° C., which is comparable with that of the polyurethanes described in U.S. Published Patent Application No. 2005/0107564. (For polyurethanes having substantially constant isocyanate to hydroxyl molar ratio, the crossover temperature tends to increase with molecular weight.) The synthesis of this polyurethane, designated "$H_{12}$MDI-high PCL", is given in detail in Example 5 below. However, when this polyurethane was applied as a lamination adhesive using a direct process, it was found that the resultant display showed poor switching at 15 V after 24 hours storage at room temperature. Increasing the applied voltage or the operating temperature of the display substantially improved the switching of the display, indicating that the lamination adhesive was probably crystallizing. This crystallization was confirmed by differential scanning calorimetry, which showed a melting/crystallization transition at about 30-40° C. during repeated heating/cooling cycles.

To reduce crossover temperature and thus tendency towards crystallization, the polyurethane was further modified by incorporation of a poly(propylene oxide) (PPO) diol at a molar ratio of polycaprolactone to PPO of 1:1 (as described in Example 6 below; this polymer is designated "$H_{12}$MDI-high PCL/PPO"), thus effectively reducing the concentration of polyester diol, and potentially improving adhesive properties. However, the resultant material still showed crystallization during DSC testing; however, since the first heating showed a melting transition but a second heating did not, the tendency for the polyurethane to crystallize was greatly reduced compared with the polyurethane without the PPO diol.

Accordingly, the test polyurethane was further modified (as described in Example 7 below; this polymer is designated "$H_{12}$MDI-NPGD/PPO") by replacing the polycaprolactone diol of Formula I above with a neopentyl glycol based diol of Formula II above having a molecular weight of 2000. As may be seen from the DSC data reported in that Example, there was no melting transition in either of two heating cycles, thus suggesting that polymer crystallization was completely eliminated.

It appears that increasing the ratio of polyether polyol to polyester polyol in the third polyurethanes of the present invention, at a constant polymer molecular weight and isocyanate to hydroxyl molar ratio, tends to increase adhesion to a given substrate as measured by peel force and to reduce the rate of hydrolysis of the polymer. Also, in practice, polyurethanes containing higher proportions of polyether polyol can by synthesized using smaller amounts of N-methylpyrrolidone, a material which causes problems in certain electro-optic displays and which may have to be removed from the polyurethane before the polyurethane is used as a lamination adhesive in an electro-optic display.

The following Examples are given, though by way of illustration only, to show details of preferred polyurethanes of the present invention.

Example 1

Custom Polyurethane with Short Polyester Segments

A polyurethane prepolymer was synthesized under a nitrogen atmosphere in a jacketed 500 mL glass reactor equipped with a mechanical stirrer, a thermometer, and a nitrogen inlet. 4,4'-Methylenebis(cyclohexyl isocyanate) (20.99 g, Bayer Desmodur W), polycaprolactone diol (31.25 g, Aldrich, average $M_n$ ca. 1250), and dibutyltin dilaurate (0.04 g, Aldrich) were charged into the reactor and the mixture was heated at 80° C. for 2 hours. Thereafter, a solution of 2,2-bis(hydroxymethyl)propionic acid (3.35 g, Aldrich) in 1-methyl-2-pyrrolidinone (10 g, Aldrich) was added into the reactor and the reaction allowed to proceed at 80° C. for another hour to give an isocyanate-terminated prepolymer. The reactor temperature was then lowered to 60° C. for 30 minutes, and triethylamine (2.4 g, Aldrich) was added to neutralize the carboxylic acid. The reactor temperature was then further lowered to 30° C. and de-ionized water (105 g) was added to convert the prepolymer to a water-borne dispersion. Chain extension was carried out immediately after the dispersing step with hexamethylenediamine (3.5 g, Aldrich) dissolved in a small amount of de-ionized water over 1 hour at 30° C. Finally, the dispersion was heated at 60° C. for one hour to ensure that all the residual isocyanate groups had reacted.

Example 2

Custom Polyurethane with Polyester Containing Steric Hindrance Group

A polyurethane prepolymer was synthesized under a nitrogen atmosphere in a jacketed glass reactor equipped with a mechanical stirrer, a thermometer, and a nitrogen inlet. 4,4'-Methylenebis(cyclohexyl isocyanate) (18.3 g) is added to the reactor, followed by 1-methyl-2-pyrrolidinone (27 g), polycaprolactone (2000 molecular weight, 49.3 g), and 2,2-bis(hydroxymethyl)propionic acid (3.4 g). The reactor was heated to 95° C. for 4 hours and then cooled to 70° C. to form an isocyanate-terminated prepolymer. Triethylamine (2.0 g) was added slowly to the prepolymer and the resultant mixture mixed for 30 minutes. Water (84 g) was added to a second reactor equipped with a mechanical stirrer and a thermocouple. Prepolymer (80 g) was then slowly transferred from the first reactor to the second reactor with stirring. Hexamethylenediamine (2.7 g of a 70% solution) was added to the second reactor for chain extension, and the resultant dispersion was heated to 80° C. for 1 hour to complete the reaction.

Example 3

Thermal Properties of Polyurethane

The polyurethanes prepared in Examples 1 and 2 above were subjected to differential scanning calorimetry. To provide a control, the aforementioned 75:25 R 9314/R 9621 blend (designated simply "Blend" in FIG. 3) was also tested in the same manner. The results are shown in FIG. 3.

Figure 3:
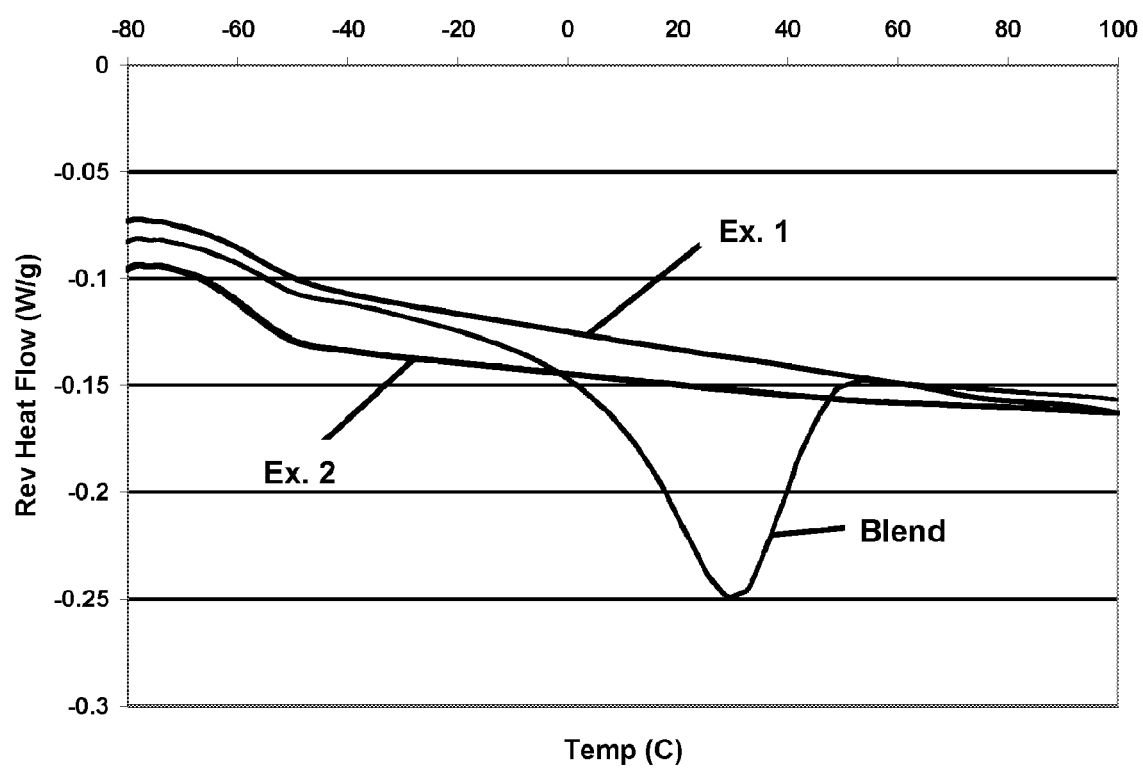
FIG. 3 shows the results of the differential scanning calorimetry tests carried out in Example 3 below.

From FIG. 3, it will be seen that the blend shows a marked exothermic peak at about 40° C., corresponding to the melting of the polyester segments in R 9314; this peak does not disappear upon re-heating. No comparable peak is present in the curve for the polyurethanes of the present invention, thus indicating that the use of short polyester segments, with or without a steric hindrance group, was indeed effective in eliminating the type of thermal transition seen with R 9314, and ensuring long term thermal stability of polyurethane binders of the present invention.

Example 4

Storage Stability of Polyurethane

Tests were conducted to determine whether the polyurethane of Example 2 had better storage stability than that of the aforementioned R 9314/R 9621 blend. For this purpose, a dried film of each binder was laminated between two ITO-coated polyester poly(ethylene terephthalate) films, the ITO layers of course being in direct contact with the polyurethane. To ensure that all samples had the same thermal history, they were heated in an oven at 70° C. for a few hours and then equilibrated at 25° C. and 50 percent relative humidity for five days. The time zero in the test described below was taken at the end of this period of storage.

Figure 4:
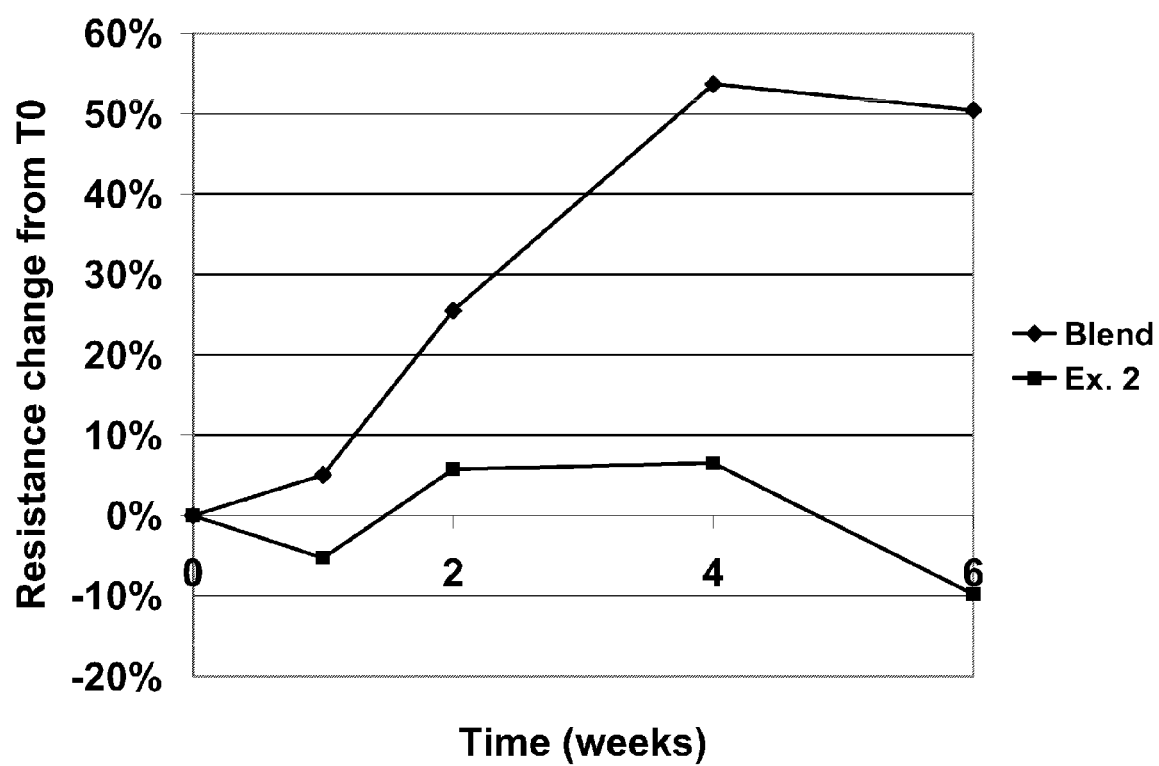
FIG. 4 shows the results of the storage stability tests carried out in Example 4 below.

The samples were then stored at 25° C. and 50 percent relative humidity for six weeks, and the resistance of the binder layer was measured at intervals. The results obtained are shown in FIG. 4. From this Figure it will be seen that the resistance of the blend increased by about 50 percent over the course of the experiment, whereas the resistance of the Example 2 polyurethane of the present invention did not vary from its initial value by more than about 10 percent. Indeed, the apparent variation of the present polyurethane may be a result of experimental error; since the experiment did not permit control of relative humidity during the resistance measurements, some random variation, up to about 10 percent, could be expected from this cause.

The results in FIG. 4 suggest that avoiding the polymer crystallization experienced with the prior art polyurethane blend helps to stabilize the electrical properties of the binder. As previously noted, the electrical properties of the binder significantly affect the electro-optic properties of an electro-optic display, and accordingly the results in FIG. 4 indicate that use of a polyurethane binder of the present invention should help to provide time stable electro-optic properties in such displays.

Example 5

Synthesis of $H_{12}$MDI-High PCL (Control)

A polyurethane prepolymer was synthesized under a nitrogen atmosphere in a three-necked round bottomed flask equipped with a mechanical stirrer, a septum, and a nitrogen inlet. 4,4'-Methylenebis(cyclohexyl isocyanate) (31.4 g, Bayer Desmodur W), polycaprolactone diol (100 g, Aldrich, average $M_n$ ca. 2000), 2,2-bis(hydroxymethyl)propionic acid (6.7 g, Aldrich), 1-methyl-2-pyrrolidinone (56 g, Aldrich) and dibutyltin dilaurate (0.04 g, Aldrich) were charged into the flask and the mixture was heated at 95° C. for 5 hours to give an isocyanate-terminated prepolymer. The reactor temperature was then lowered to 70° C., and triethylamine (5 g, Aldrich) was added to neutralize the carboxylic acid, and the reaction mixture was allowed to stand for 30 minutes. Water (210 g) was added to a jacketed 500 mL reactor equipped with a mechanical stirrer, a nitrogen inlet, and a thermometer. The prepolymer was then transferred to the water-containing reactor with stirring to form a water-borne dispersion. Chain extension was carried out immediately after the dispersing step with hexamethylenediamine (3.2 g, Aldrich) dissolved in a small amount of de-ionized water over 30 minutes at room temperature. Finally, the dispersion was heated at 70° C. for one hour to ensure that all the residual isocyanate groups had reacted.

Example 6

Synthesis of $H_{12}$MDI-PCL/PPO

A polyurethane prepolymer was synthesized under a nitrogen atmosphere in a three-necked round bottomed flask equipped with a mechanical stirrer, a septum, and a nitrogen inlet. 4,4'-Methylenebis(cyclohexyl isocyanate) (31.4 g, Bayer Desmodur W), polycaprolactone diol (50 g, Aldrich, average $M_n$ ca. 2000), poly(propylene oxide) diol (50 g, Aldrich, average $M_n$ ca. 2000), 2,2-bis(hydroxymethyl)propionic acid (6.7 g, Aldrich), 1-methyl-2-pyrrolidinone (40 g, Aldrich) and dibutyltin dilaurate (0.04 g, Aldrich) were charged into the flask and the mixture was heated at 95° C. for 6 hours to give an isocyanate-terminated prepolymer. The reactor temperature was then lowered to 70° C., and triethylamine (3.79 g, Aldrich) was added to neutralize the carboxylic acid, and the reaction mixture was allowed to stand for 30 minutes. Water (220 g) was added to a jacketed 500 mL reactor equipped with a mechanical stirrer, a nitrogen inlet, and a thermometer. The prepolymer was then transferred to the water-containing reactor with stirring to form a water-borne dispersion. Chain extension was carried out immediately after the dispersing step with hexamethylenediamine (4.6 g, Aldrich) dissolved in a small amount of de-ionized water over 30 minutes at room temperature. Finally, the dispersion was heated at 70° C. for one hour to ensure that all the residual isocyanate groups had reacted.

Example 7

Synthesis of $H_{12}$MDI-NPGD/PPO

A polyurethane prepolymer was synthesized under a nitrogen atmosphere in a three-necked round bottomed flask equipped with a mechanical stirrer, a septum, and a nitrogen inlet. 4,4'-Methylenebis(cyclohexyl isocyanate) (31.4 g, Bayer Desmodur W), CAPA 2200A diol (50 g, available from Solvay SA, Brussels, Belgium, average $M_n$ ca. 2000), poly(propylene oxide) diol (50 g, Aldrich, average $M_n$ ca. 2000), 2,2-bis(hydroxymethyl)propionic acid (6.7 g, Aldrich), 1-methyl-2-pyrrolidinone (40 g, Aldrich) and dibutyltin dilaurate (0.04 g, Aldrich) were charged into the flask and the mixture was heated at 95° C. for 6 hours to give an isocyanate-terminated prepolymer. The reactor temperature was then lowered to 70° C., and triethylamine (3.79 g, Aldrich) was added to neutralize the carboxylic acid, and the reaction mixture was allowed to stand for 30 minutes. Water (220 g) was added to a jacketed 500 mL reactor equipped with a mechanical stirrer, a nitrogen inlet, and a thermometer. The prepolymer was then transferred to the water-containing reactor with stirring to form a water-borne dispersion. Chain extension was carried out immediately after the dispersing step with hexamethylenediamine (4.6 g, Aldrich) dissolved in a small amount of de-ionized water over 30 minutes at room temperature. Finally, the dispersion was heated at 70° C. for one hour to ensure that all the residual isocyanate groups had reacted.

Figure 5:
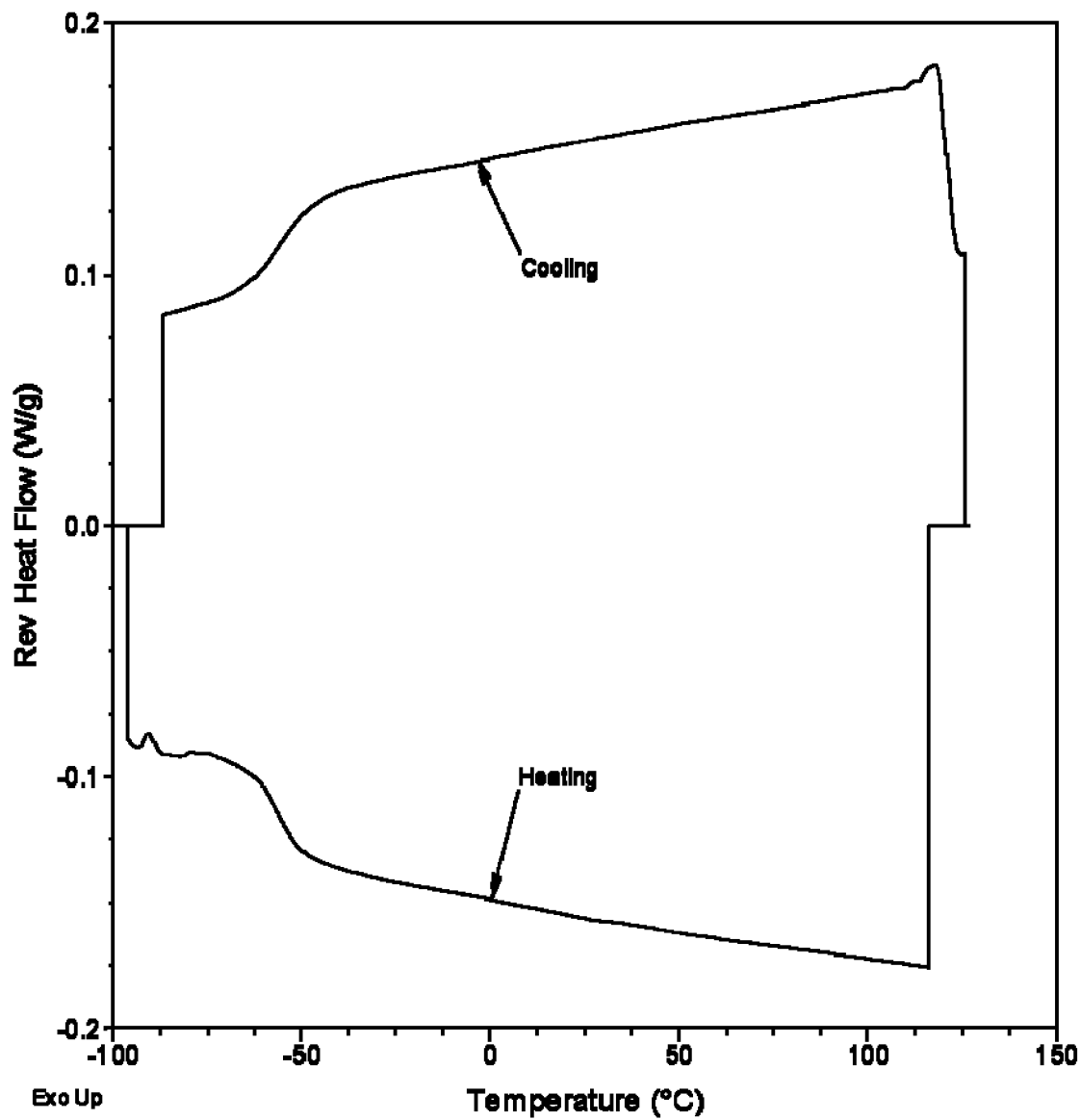
FIG. 5 shows a DSC trace of the polyurethane produced in Example 7 below.

FIG. 5 of the accompanying drawings is a DSC scan of a dried film of the resultant polymer, and shows that the dried film was free from crystalline material.

It will be apparent to those skilled in the art that numerous changes and modifications can be made in the specific embodiments of the present invention described above without departing from the scope of the invention. In particular, although the invention has been described above mainly in connection with encapsulated electrophoretic media having discrete capsules, similar advantages can be achieved by the use of the binders of the present invention in the other types of electro-optic displays previously discussed. Accordingly, the whole of the foregoing description is to be construed in an illustrative and not in a limitative sense.

The invention claimed is:

1. A polyurethane formed from an isocyanate, a polyether diol and a polyester diol, the polyester diol having a molecular weight less than about 2000, or comprising two polyester diol segments connected by a steric hindrance group, each of the polyester diol segments having a molecular weight less than about 2000, the molar ratio of polyether diol to polyester diol being in the range of from about 1:9 to about 9:1.

2. A polyurethane according to claim 1 wherein the molar ratio of polyether diol to polyester diol is in the range of from about 1:4 to about 4:1.

3. A polyurethane according to claim 1 wherein the polyester diol is a polycaprolactone diol having a molecular weight less than about 1500.

4. A polyurethane according to claim 1 wherein the polyester diol is a polycaprolactone diol comprising two polycaprolactone segments connected by a bending group, each of the polycaprolactone segments having a molecular weight not greater than about 1500.

5. A polyurethane according to claim 1 wherein the isocyanate is 4,4'-methylenebis(cyclohexyl isocyanate).

6. A polyurethane according to claim 1 wherein the polyether diol is a poly(propylene oxide) diol.

7. A polyurethane according to claim 1 wherein the polyether diol has a molecular weight in the range of from about 1000 to about 3000.

8. A polyurethane according to claim 1 having an isocyanate:hydroxyl ratio of less than about 1.3.

9. A polyurethane according to claim 1 having a crossover temperature in the range of from about 10 to about 90° C. at 1 Hz.

10. A polyurethane according to claim 9 having a crossover temperature in the range of from about 40 to about 80° C. at 1 Hz.

11. A polyurethane according to claim 1 in the form of an aqueous latex.

12. A sub-assembly for use in constructing an electro-optic display, the sub-assembly comprising a layer of a solid electro-optic material and a layer of lamination adhesive adhered to the layer of electro-optic material, the layer of lamination adhesive comprising a polyurethane according to claim 1.

13. An electro-optic display comprising a sub-assembly according to claim 12 and at least one electrode arranged to apply an electric field to the layer of electro-optic material.

14. An electronic book reader, portable computer, tablet computer, cellular telephone, smart card, sign, watch, shelf label or flash drive comprising a display according to claim 13.

15. A sub-assembly according to claim 12 further comprising:
   a light-transmissive electrically-conductive layer on the opposed side of the layer of electro-optic material from the layer of lamination adhesive; and
   a release sheet on the opposed side of the layer of lamination adhesive from the layer of electro-optic material.

16. A sub-assembly according to claim 12 further comprising:
   a second adhesive layer on the opposed side of the layer of electro-optic material from the layer of lamination adhesive; and
   a release sheet disposed on the opposed side of the second adhesive layer from the layer of electro-optic material.

17. A sub-assembly according to claim 12 further comprising:
   on the opposed side of the layer of lamination adhesive from the layer of electro-optic material, at least one of a light-transmissive protective layer and a light-transmissive electrically-conductive layer; and
   a release sheet on the opposed side of the layer of electro-optic material from the layer of lamination adhesive.

18. A sub-assembly according to claim 12 further comprising first and second release sheets covering the exposed surfaces of the layer of electro-optic material and the layer of lamination adhesive.

* * * * *